UNITED STATES PATENT OFFICE.

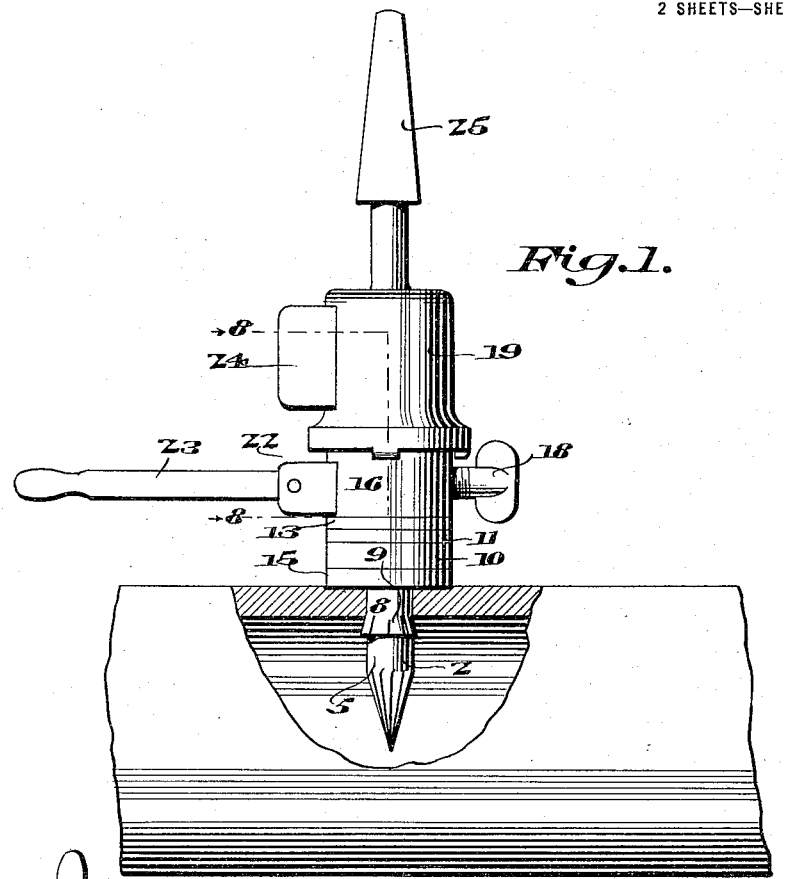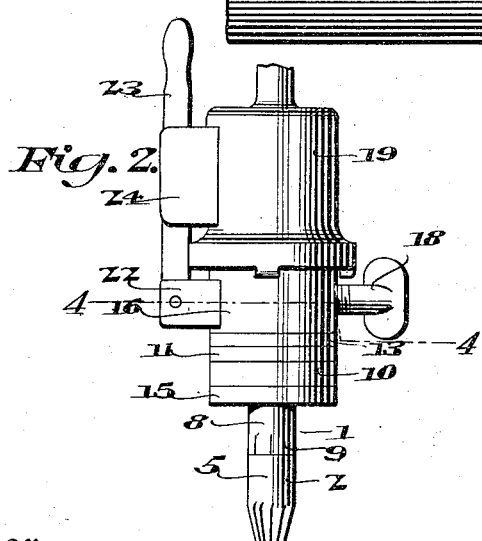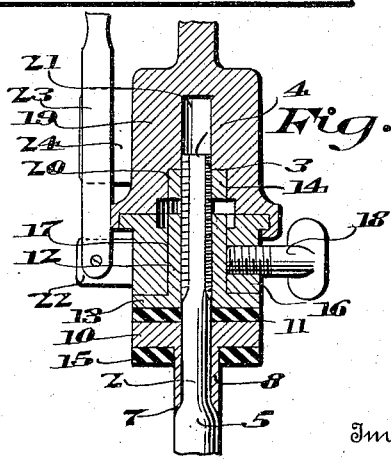

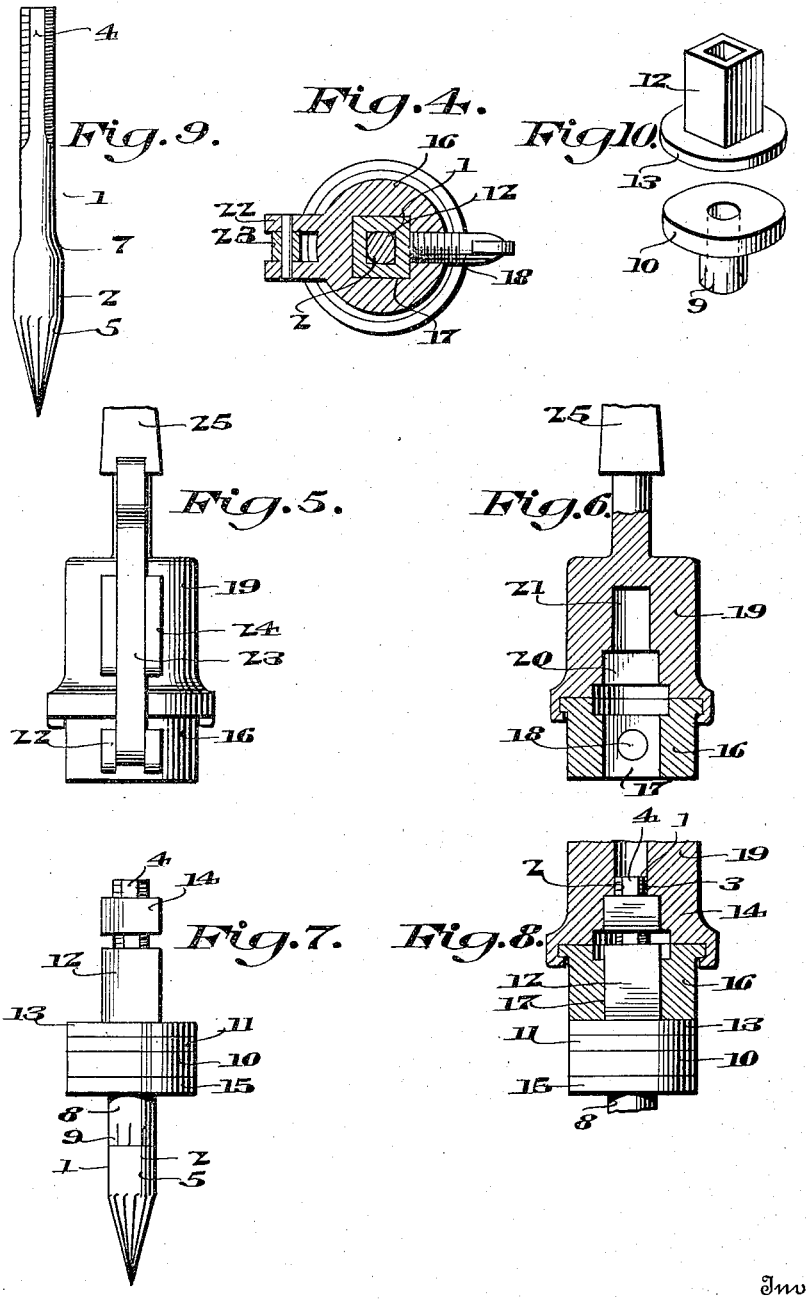

WILLIAM H. CROW, OF SAN YSIDRO, CALIFORNIA.

PIPE-PATCHING DEVICE.

1,156,890.  Specification of Letters Patent.  Patented Oct. 19, 1915.

Application filed July 28, 1914. Serial No. 853,728.

*To all whom it may concern:*

Be it known that I, WILLIAM H. CROW, a citizen of the United States, residing at San Ysidro, in the county of San Diego and State of California, have invented new and useful Improvements in Pipe-Patching Devices, of which the following is a specification.

This invention relates to improvements in pipe patching devices and has particular application to a plug patch.

In carrying out the present invention, it is my purpose to provide a patching device whereby the holes in pipes may be reamed out so as to eliminate ragged edges and form a new surface and the plug subsequently expanded within the opening to bind against the side wall thereof thereby forming a fluid tight patch.

It is also my purpose to provide a device of the class described which will embody among other features a plug capable of movement into the hole or aperture in the pipe and which may be subsequently expanded to completely fill the hole, and a chuck for forcing the plug through the hole in the pipe and expanding such plug.

With the above and other objects in view, the invention consists in the construction, combination and arrangement of parts hereinafter set forth in and falling within the scope of the claims.

In the accompanying drawings; Figure 1 is a view in side elevation of a pipe patching device constructed in accordance with the present invention, the plug being shown inserted in the pipe. Fig. 2 is a view in side elevation of the plug removed from the pipe. Fig. 3 is a vertical central sectional view through the plug. Fig. 4 is a cross sectional view on the line 4—4 of Fig. 2. Fig. 5 is a view in side elevation of the core of the plug. Fig. 6 is a view in side elevation of the chuck removed from the plug. Fig. 7 is a vertical central sectional view through the chuck. Fig. 8 is a fragmentary sectional view on the line 8—8 of Fig. 1. Fig. 9 is a view in side elevation of the plug. Fig. 10 is a collective view showing parts of the patch in perspective.

Referring now to the drawings in detail, 1 designates the plug as an entirety, such plug comprising a metal core in the form of a rod 2 having one end thereof screw threaded as at 3 and formed at diametrically opposite points with flat portions 4 and the opposite end portion circumferentially enlarged as at 5 and tapered to form a reamer bit. At the junction of the circumferentially enlarged portion 5 with the main body portion of the rod the latter curves outwardly as at 7 so as to eliminate the formation of an abrupt shoulder at this point. Encircling the core 2 at the curved portion 7 thereof and having the outer surface flush with the circumferentially enlarged end of the core is a sleeve 8 having the end surrounding the curved portion 7 split longitudinally for a portion of its length as at 9 and such split portions spaced apart equal distances about the sleeve, and the opposite end formed with an outwardly projecting circumferentially extending flange 10. Encircling the core 2 immediately above the flange 10 and placed in face to face contact with the latter is a washer 11 formed of rubber or other fabric, while surrounding the shank above the washer is a sleeve 12 having the bore therein of a cross sectional configuration corresponding with that of the threaded portion of the core so that rotation of the sleeve 12 independently of the core is eliminated. Formed on one end of the sleeve 12 and bearing against the adjacent face of the washer 11 is an outwardly projecting flange 13, while threaded onto the threaded end of the core and adapted to abut the adjacent end of the sleeve 12 is a nut 14.

In practice, the bit end 6 of the core is forced through the hole or aperture in the pipe and the plug rotated so as to ream out the aperture and thereby eliminate ragged edges and form a new wall for the aperture. In the continued movement of the plug the core passes through the opening a distance equal to the distance between the reaming end of the core and the washer 15, thereby placing the sleeve 8 within the opening, the washer 15 surrounding the sleeve 8 immediately adjacent to the flange 10. In this position of the plug the sleeve 12 is held against rotation and the nut 14 revolved about the threaded end of the core thereby drawing the latter through the sleeves 8 and 12. In the initial longitudinal movement of the core through the sleeve 8 the curved portion 7 spreads the split end of such sleeve while in the continued movement of the core the enlarged circumferential portion thereof rides into the sleeve and so effectively spreads the latter against the inner wall of the pipe and holds the same in this condition, the inner spread end of the sleeve coacting with the washer 15 and flange 10 to form a fluid tight patch for the pipe.

In order to rotate the plug as an entirety so that the reamer bit may cut the side wall of the hole and to rotate the nut 14 independently of the remaining parts of the plug so as to spread the expansion sleeve I employ a chuck comprising a lower section 16 formed with a longitudinal bore 17 of cross sectional configuration corresponding to that of the sleeve 12. Threaded through the section 16 is a set screw 18 adapted to enter the bore and bind against the sleeve 12 when the chuck is applied to the plug. Connected to one end of the section 16 coaxial therewith and capable of rotation relatively thereto is the second section 19 of the chuck, such section being formed with an axial recess 20 contiguous the upper end of the bore 17 in the section 16, and a bore 21 contiguous the recess 20 and coaxial therewith. The recess 20 corresponds in cross sectional configuration to that of the nut 14 and is adapted to receive the latter in the application of the chuck to the plug.

Formed on the lower section 16 and projecting outwardly therefrom are pivot ears 22 and pivoted between the ears 22 is one end of a locking lever 23 capable of swinging movement and adapted to enter the space between the lugs 24 formed on the side wall of the section 19 of the chuck and projecting outwardly therefrom. When the lever 23 is in engagement with the lugs 24 relative movement of the sections of the chuck is eliminated. Formed on the closed end of the chuck and projecting outwardly therefrom is a tang 25 adapted to be inserted in the socket of a brace so that the chuck may be rotated.

In operation, the chuck is placed over the sleeve 12 and nut 14, the inner wall of the recess 20 abutting the nut 14, while the axially alining bore 17 and recess 20 receive the sleeve 12 and nut 14 respectively. The lever 23 is now swung to locking position and the chuck revolved. In the rotation of the chuck the reamer 6 cuts the wall of the hole in the pipe and carries the core into the pipe as previously described. After the expansion sleeve has entered the pipe the lever 23 is swung to unlocking position and held so as to prevent rotation of the section 16 of the chuck, while the section 19 of the chuck continues to rotate. In this movement of the section 19 of the chuck the nut 14 is revolved thereby drawing the core 2 through the axially alining sleeves 8 and 12 with the effect to expand the sleeve 8 as heretofore described.

From the foregoing description taken in connection with the accompanying drawings, the construction, mode of operation and manner of employing my improved pipe patching device will be readily apparent. It will be seen that I have provided a pipe patching device whereby the hole in the pipe is reamed out so as to form a new wall to receive the plug and whereby the hole will be effectively and efficiently filled.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:

1. In a pipe patching device, a plug comprising a core having one end thereof enlarged circumferentially and formed to provide a reamer body adapted to penetrate the pipe, a sleeve surrounding said core immediately adjacent to the enlarged end portion thereof and designed to follow the reamer into the pipe, and means for moving said core relatively to said sleeve in a direction reverse to the first movement thereof whereby the sleeve will be expanded in the opening in the pipe.

2. In a pipe patching device, a plug adapted to penetrate the pipe and capable of expansion succeeding the application of the same to the pipe, a chuck for forcing the plug into the pipe, said chuck comprising two sections capable of relative rotary movement, means holding said sections against relative movement in the application of the plug to the pipe, said means also operable to hold one section against movement while allowing the rotation of the other section, and means operable from the movable section to expand the plug.

3. In a pipe patching device, a plug comprising a core having one end thereof enlarged circumferentially and formed to provide a reamer bit adapted to penetrate the pipe, a sleeve surrounding said core immediately adjacent to the handle end portion thereof and designed to follow the reamer into the pipe, a flange on the upper end of said sleeve, a second sleeve surrounding said core coaxial with the first sleeve and having the outer surface thereof non-circular in cross section, a nut threaded onto said core adjacent to said last sleeve and means acting upon said last sleeve to rotate the plug as an entirety to pass the latter into the pipe or adapted to operate the nut independently of the remaining parts of the plug whereby the core will be drawn through the first sleeve to expand the latter in the opening in the pipe.

4. In a pipe patching device, a plug comprising a core having one end thereof enlarged circumferentially and formed to provide a reamer bit adapted to penetrate the pipe, a sleeve surrounding said core immediately adjacent to the enlarged end portion thereof and designed to follow the reamer into the pipe, a second sleeve surrounding the core coaxial with the first sleeve and rotatable with the core, a nut threaded upon the end of the core adjacent to said last sleeve, a chuck comprising a section surrounding said second sleeve, and a section surrounding said nut, and means whereby both sections may be rotated simultaneously, and the second section rotated independently of the first section.

5. In a pipe patching device, a plug comprising a core having one end thereof enlarged circumferentially and formed to provide a reamer bit adapted to penetrate the pipe, a sleeve surrounding said core immediately adjacent to the enlarged end portion thereof and designed to follow the reamer into the pipe, a second sleeve surrounding the core coaxial with the first sleeve and rotatable with the core, a nut threaded upon the end of the core adjacent to said last sleeve, a chuck comprising a section surrounding said second sleeve, a section surrounding said nut, and means locking said sections together for simultaneous movement and operable to release said sections whereby the second section may be actuated independently of the first section.

6. In a pipe patching device, a plug comprising a core having one end thereof enlarged circumferentially and formed to provide a reamer bit adapted to penetrate the pipe, a sleeve surrounding said core immediately adjacent to the enlarged end portion thereof and designed to follow the reamer into the pipe, a second sleeve surrounding the core coaxial with the first sleeve and rotatable with the core, a nut threaded upon the end of the core adjacent to said last sleeve, a chuck comprising a section surrounding said second sleeve, a section surrounding said nut, means locking said sections together for simultaneous movement and operable to release said sections whereby the second section may be actuated independently of the first section, and means carried by the first section for holding the latter to the second-named sleeve.

In testimony whereof I affix my signature in presence of two witnesses.

WILLIAM H. CROW.

Witnesses:
L. D. CAMPBELL,
ALTA L. CROW.

Copies of this patent may be obtained for five cents each, by addressing the " Commissioner of Patents, Washington, D. C."